(12) United States Patent
Martin (10) Patent No.: US 9,685,887 B2
(45) Date of Patent: Jun. 20, 2017

(54) CONTROLLING POWER CONVERSION SYSTEMS

(71) Applicant: Younicos, Inc., Kyle, TX (US)

(72) Inventor: Eric Martin, Stapleton, GA (US)

(73) Assignee: YOUNICOS INC., Kyle, TX (US)

( * ) Notice: Subject to any disclaimer, the term of this patent is extended or adjusted under 35 U.S.C. 154(b) by 735 days.

(21) Appl. No.: 13/650,957

(22) Filed: Oct. 12, 2012

(65) Prior Publication Data

US 2014/0103726 A1   Apr. 17, 2014

(51) Int. Cl.
- *H02J 3/18* (2006.01)
- *H02M 7/493* (2007.01)
- *H02M 1/36* (2007.01)
- *H02M 1/00* (2006.01)

(52) U.S. Cl.
CPC ............. *H02M 7/493* (2013.01); *H02M 1/36* (2013.01); *H02J 3/18* (2013.01); *H02M 2001/0032* (2013.01); *Y02B 70/16* (2013.01); *Y02E 40/30* (2013.01); *Y10T 307/615* (2015.04); *Y10T 307/62* (2015.04); *Y10T 307/707* (2015.04)

(58) Field of Classification Search
None
See application file for complete search history.

(56) References Cited

U.S. PATENT DOCUMENTS

| | | | |
|---|---|---|---|
| 5,274,571 A | 12/1993 | Hesse et al. | |
| 5,369,353 A | 11/1994 | Erdman | |
| 5,563,802 A | 10/1996 | Plahn et al. | |
| 5,710,501 A | 1/1998 | Van Phuoc et al. | |
| 6,522,031 B2 | 2/2003 | Provanzana et al. | |
| 6,580,977 B2 | 6/2003 | Ding et al. | |
| 6,674,265 B2 | 1/2004 | Yoshida et al. | |
| 6,693,409 B2 * | 2/2004 | Lynch et al. | 323/208 |

(Continued)

FOREIGN PATENT DOCUMENTS

| | | |
|---|---|---|
| EP | 2 164 147 A2 | 3/2010 |
| EP | 2 492 501 A1 | 8/2012 |

(Continued)

OTHER PUBLICATIONS

US 6,337,562, 01/2002, Kehrli et al. (withdrawn)

(Continued)

*Primary Examiner* — Rexford Barnie
*Assistant Examiner* — Terrence Willoughby
(74) *Attorney, Agent, or Firm* — Foley & Lardner LLP (57) ABSTRACT

Methods and systems for controlling power conversion systems. In one aspect, a power management system includes a first power conversion system coupled to a first energy source and a second power conversion system coupled to a second energy source, and a control system. The control system causes, while the first power conversion system is operating in an active mode and the second power conversion system is operating in a standby mode, the second power conversion system to exit the standby mode, the second power conversion system providing a reactive power flow upon exiting the standby mode. The control system causes the first power conversion system to provide a compensatory reactive power flow to compensate for at least a portion of the reactive power flow from the second power conversion system.

25 Claims, 6 Drawing Sheets

(56) References Cited

U.S. PATENT DOCUMENTS

| | | |
|---|---|---|
| 6,747,370 B2 | 6/2004 | Abe |
| 6,858,953 B2 | 2/2005 | Stahlkopf |
| 6,900,556 B2 | 5/2005 | Provanzana et al. |
| 7,002,260 B2 | 2/2006 | Stahlkopf |
| 7,227,275 B2 | 6/2007 | Hennessy et al. |
| 7,248,490 B2 | 7/2007 | Olsen et al. |
| 7,248,946 B2 | 7/2007 | Bashaw et al. |
| 7,265,456 B2 | 9/2007 | Hennessy |
| 7,265,521 B2 | 9/2007 | Kehrli et al. |
| 7,298,059 B2 | 11/2007 | Delmerico et al. |
| 7,353,083 B2 | 4/2008 | Hennessy |
| 7,432,611 B2 | 10/2008 | Stahlkopf |
| 7,613,548 B2 | 11/2009 | Cardinal et al. |
| 7,622,816 B2 | 11/2009 | Stahlkopf |
| 7,679,215 B2 | 3/2010 | Delmerico et al. |
| 7,826,908 B2 | 11/2010 | Cheng et al. |
| 7,890,217 B2 | 2/2011 | Cardinal et al. |
| 7,908,036 B2 | 3/2011 | Kirchner et al. |
| 7,941,246 B2 | 5/2011 | Miller et al. |
| 7,952,232 B2 | 5/2011 | Burra et al. |
| 8,159,186 B2 | 4/2012 | Iida et al. |
| 8,159,188 B2 | 4/2012 | Anderson |
| 8,185,249 B2 | 5/2012 | Kirchner et al. |
| 8,222,765 B2 | 7/2012 | Collins et al. |
| 8,237,301 B2 | 8/2012 | Delmerico et al. |
| 8,277,964 B2 | 10/2012 | Hennessy |
| 8,301,311 B2 | 10/2012 | Nelson |
| 8,335,547 B2 | 12/2012 | Otterson |
| 8,338,987 B2 | 12/2012 | O'Brien et al. |
| 8,344,550 B2 | 1/2013 | Delmerico et al. |
| 8,373,312 B2 | 2/2013 | O'Brien et al. |
| 8,400,112 B2 | 3/2013 | Anderson |
| 8,452,461 B2 | 5/2013 | Sawyer et al. |
| 8,471,406 B2 | 6/2013 | Patel et al. |
| 8,532,834 B2 | 9/2013 | Delong et al. |
| 2002/0075701 A1* | 6/2002 | Hubert ............... H02J 3/1842 363/35 |
| 2005/0063115 A1* | 3/2005 | Nayar ............... H02J 7/35 361/82 |
| 2008/0224541 A1 | 9/2008 | Fukuhara |
| 2009/0184835 A1 | 7/2009 | Deaver et al. |
| 2010/0057267 A1 | 3/2010 | Liu et al. |
| 2010/0145533 A1 | 6/2010 | Cardinal et al. |
| 2010/0309695 A1 | 12/2010 | Fornage |
| 2011/0001318 A1 | 1/2011 | Nelson |
| 2011/0187106 A1 | 8/2011 | Ichinose et al. |
| 2011/0221276 A1 | 9/2011 | Geinzer et al. |
| 2012/0049636 A1 | 3/2012 | Galbraith et al. |
| 2012/0056588 A1 | 3/2012 | Cai et al. |
| 2012/0133209 A1 | 5/2012 | O'Brien |
| 2012/0136494 A1 | 5/2012 | Kirchner et al. |
| 2012/0248873 A1 | 10/2012 | Oudalov et al. |
| 2013/0249215 A1 | 9/2013 | Egedal et al. |
| 2013/0257351 A1 | 10/2013 | Nishibayashi et al. |
| 2013/0278203 A1 | 10/2013 | Coe et al. |

FOREIGN PATENT DOCUMENTS

| | | |
|---|---|---|
| JP | 08-171919 | 7/1996 |
| WO | WO 2009/136975 | 11/2009 |
| WO | WO 2013/068149 A2 | 5/2013 |

OTHER PUBLICATIONS

International Preliminary Report on Patentability mailed Apr. 23, 2015 regarding Application No. PCT/US2013/064655 (12 pgs).
Patent Examination Report No. 1 dated Nov. 20, 2015, from related Australian application No. 2013328942.
Patent Examination Report No. 2 dated May 31, 2016, from related Australian application No. 2013328942.
Blaabjerg et al., "Power Electronics and Reliability in Renewable Energy Systems," IEEE, 2012, pp. 19-30.
Extended European Search Report issued in EP application No. 13845340 dated Mar. 27, 2017.

* cited by examiner

CONTROLLING POWER CONVERSION SYSTEMS

BACKGROUND

This specification relates to controlling power conversion systems, and more particularly, to mitigating parasitic effects resulting from the activation and deactivation of power conversion systems.

A power conversion system converts power from AC to DC or DC to AC or both. Examples of power conversion systems include inverters, rectifiers, and bidirectional inverters that convert AC to DC in one direction and DC to AC in the opposite direction. Power conversion systems can convert DC power to AC power for delivery to an AC load such as, for example, commercial or residential appliances and the power grid. DC power may be provided to the power conversion system, for example, from a photovoltaic array or a power storage device, such as one or more battery or capacitor banks charged by any combination of power sources, including wind turbines, photovoltaic arrays, hydroelectric generators, and thermal generators. In systems incorporating bidirectional inverters, the power storage device may alternatively or conjunctively receive charge from the power grid.

Despite ongoing efforts to improve their efficiency, power conversion systems generally consume power when they are in an active switching state. Conversion efficiency typically varies with the load, and usually peaks at about two-thirds of the system's capacity ("peak efficiency"). Because power conversion systems consume a relatively fixed amount of power during normal operation, the efficiency decreases when providing lower amounts of power. Some power conversion systems implement standby modes to improve overall efficiency. In typical standby mode implementations, the power conversion system disconnects the isolation transformer from the grid, thereby deactivating the power conversion system and improving the efficiency of the system. This is particularly useful in large photovoltaic array installations where overnight tare (no-load) losses may be significant.

A power conversion system in standby mode is typically reactivated by reconnecting the isolation transformer to the power grid. However, this may result in large in-rush currents, in some cases of up to six times or eight times the rated current of the system. For large scale power systems, the in-rush currents present a significant reactive current draw on the grid, similar to large electric motors or pumps starting up from a stalled state. For example, a typical 100 kW grid-tied inverter may present a 600 kVA load on the grid over a 10 ms period. Simultaneously activating multiple power conversion systems may result in a utility violation due to excessive reactive power draw or complete power system collapse on a small power system.

SUMMARY

In general, a large scale power management system may be controlled such that a time associated with reactivating, e.g., from a standby mode, one or more power conversion systems is decreased without the need for a soft-start sequence. The power management system may be controlled such that multiple power conversion systems may be reactivated quickly while mitigating disturbances due to reactive power flows.

In general, one aspect of the subject matter described in this specification can be embodied in a power management system comprising a first inverter and a second inverter coupled in parallel with the first inverter. The first inverter is configured to compensate for at least a portion of the reactive power flows associated with the second inverter transitioning from a standby mode to an active mode. The power management system can include a third inverter coupled in parallel with the first and second inverters, wherein at least one of the first inverter and the second inverter is configured to compensate for at least a portion of a change in reactive power flow presented at an output of the third inverter upon the third inverter transitioning from a standby mode to an active mode. The power management system can include an inverter control module coupled to the first, second, and third inverters, and configured to stagger activation of the second and third inverters.

In general, another aspect of the subject matter described in this specification can be embodied in a power management system comprising: a first power conversion system coupled to a first energy source; a second power conversion system coupled to a second energy source, wherein the first power conversion system and the second power conversion system are configured to provide power to a common output in an active mode; and a control system coupled to both the first power conversion system and the second power conversion system and configured to: cause, while the first power conversion system is operating in an active mode and the second power conversion system is operating in a standby mode, the second power conversion system to exit the standby mode, the second power conversion system providing a reactive power flow to the common output upon exiting the standby mode; and cause the first power conversion system to provide a compensatory reactive power flow to the common output to compensate for at least a portion of the reactive power flow from the second power conversion system.

These and other embodiments can each optionally include one or more of the following features. The second power conversion system provides the reactive power flow for a period of time upon exiting the standby mode, wherein causing the first power conversion system to provide the compensatory reactive power flow comprises, after the period of time passes, configuring the first power conversion system to stop providing the compensatory reactive power flow to the common output. The power management further comprises a third power conversion system coupled to a third energy source and configured to provide power to the common output, wherein the control system is configured to: determine, while the first power conversion system is operating in the active mode and the second and third power conversion systems are operating in the standby mode, to provide power to the common output from both the second and third energy sources; cause the second power conversion system to exit the standby mode, the second power conversion system providing a first reactive power flow to the common output for a first period of time upon exiting the standby mode; cause the first power conversion system to provide a first compensatory reactive power flow to the common output for the first period of time; cause, after the first period of time, the third power conversion system to exit the standby mode, thereby providing a second reactive power flow to the common output for a second period of time, while the first power conversion system continues to provide the first compensatory reactive power flow to the common output for the second period of time; and cause, after the second period of time, the first power conversion system to stop providing the first compensatory reactive power flow to the common output. The control system comprises a system control module, wherein the first power conversion system includes a first inverter controller and the second power conversion system includes a second inverter controller, and wherein causing the second power conversion system to exit the standby mode comprises sending an activate command to the second inverter controller, and wherein causing the first power conversion system to provide a compensatory reactive power flow comprises sending a reactive power command to the first inverter controller. The second power conversion system comprises power electronic switching and a line filter, and wherein causing the second power conversion system to exit the standby mode comprises configuring the second power conversion system to electrically expose the line filter to the common output. The line filter is an LC filter. Causing the second power conversion system to exit the standby mode comprises configuring a pulse width modulation (PWM) control module to provide a PWM control signal to the power electronic switching. The common output and the control system are coupled to an intermittent power source, and wherein the control system is configure to determine to provide additional power to the common output by determining that the intermittent power source is providing a decreasing amount of power. The intermittent power source comprises one or more wind turbines coupled to a utility grid. Determining that the intermittent power source is providing a decreasing amount of power comprises determining that the one or more wind turbines are operating at a particular point on a power curve where relatively small changes in wind speed result in large changes in power output. The control system is further configured to: determine that the intermittent power source is providing an increasing amount of power; and cause the first power conversion system or the second power conversion system or both to store energy from the intermittent power source in the first and second energy sources.

In general, another aspect of the subject matter described in this specification can be embodied in methods that include the actions of configuring a first power conversion system into an active mode so that the first power conversion system is providing power from a first energy source to a common output; configuring a second power conversion system into a standby mode so that the second power conversion system is not providing power from a second energy source to the common output; while the first power conversion system is operating in the active mode and the second power conversion system is operating in a standby mode, determining to provide additional power to the common output; configuring the second power conversion system to exit the standby mode, thereby providing a reactive power flow to the common output; and configuring the first power conversion system to provide a compensatory reactive power flow to the common output to compensate for at least a portion of the first reactive power flow.

In general, another aspect of the subject matter described in this specification can be embodied in methods that include the actions of configuring first and second power conversion systems into an active mode so that the first and second power conversion systems are providing power to a common output; determining to decrease the total power at the common output; configuring the second power conversion system to enter a standby mode, thereby providing a reactive power flow to the common output; and configuring the first power conversion system to provide a compensatory reactive power flow to the common output to compensate for at least a portion of the reactive power flow.

Particular embodiments of the subject matter described in this specification can be implemented so as to realize one or more of the following advantages. Given a system with multiple power conversion systems, the efficiency of the system as a whole may be improved, for example, by enabling a reduction in the number of active power conversion systems necessary to operate the system reliably. Moreover, deadbands related to power conversion system reactivation times can be reduced to allow for more aggressive deactivation of power conversion resources. Additionally, impact to the local power system from varying reactive power flows can be mitigated.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Large reactive current draws and long startup sequences can limit the usefulness of standby modes in large scale power management systems. Such systems typically have multiple power conversion systems coupled in parallel to provide support services to power production facilities and/or an AC grid by utilizing a power storage array. These support services may include, for example, frequency regulation, voltage regulation, power smoothing, and power storage. Other support services may also be provided. For example, in a wind farm, a large scale power management system may be used to mitigate ramp rate violations. Ramp rate violations occur when the wind farm's power output increases or decreases at a rate that exceeds a predetermined ramp rate limit. Such an increase or decrease can occur, for example, upon the occurrence or cessation of sudden wind gusts.

During high wind periods, ramp rate violations can be mitigated by utilizing the full capacity of the power storage system to transfer power to or from the power storage array. During low wind periods, the number of active inverters necessary to support production may decrease significantly. During such periods, some power conversion systems may be placed in standby mode to improve the system's efficiency. However, the fluctuation in reactive power flows and the long wakeup delays may restrict a system's ability to limit the number of active inverters to the minimum number necessary to manage the current power output level. As a result, power conversion systems are typically maintained in an active state and operating at less than their rated capacity, thereby limiting the system's overall efficiency.

Alternatively, as described in more detail below, large scale power management systems may be operated such that a time associated with reactivating power conversion systems is decreased. For example, by modifying a startup sequence, power converters may be switched from standby mode to active mode within a few cycles. Further, significant changes in reactive power flow resulting from activating or deactivating a power converter may be mitigated by configuring active power conversion systems to provide or draw reactive power to or from the distribution network. In some implementations, the operating capacity of a power storage system can be increased rapidly by activating inactive power conversion systems with a staggered start sequence. Although the systems for implementing these and other techniques are described in the context of certain regenerative power source applications, the invention is not so limited.

Figure 1:
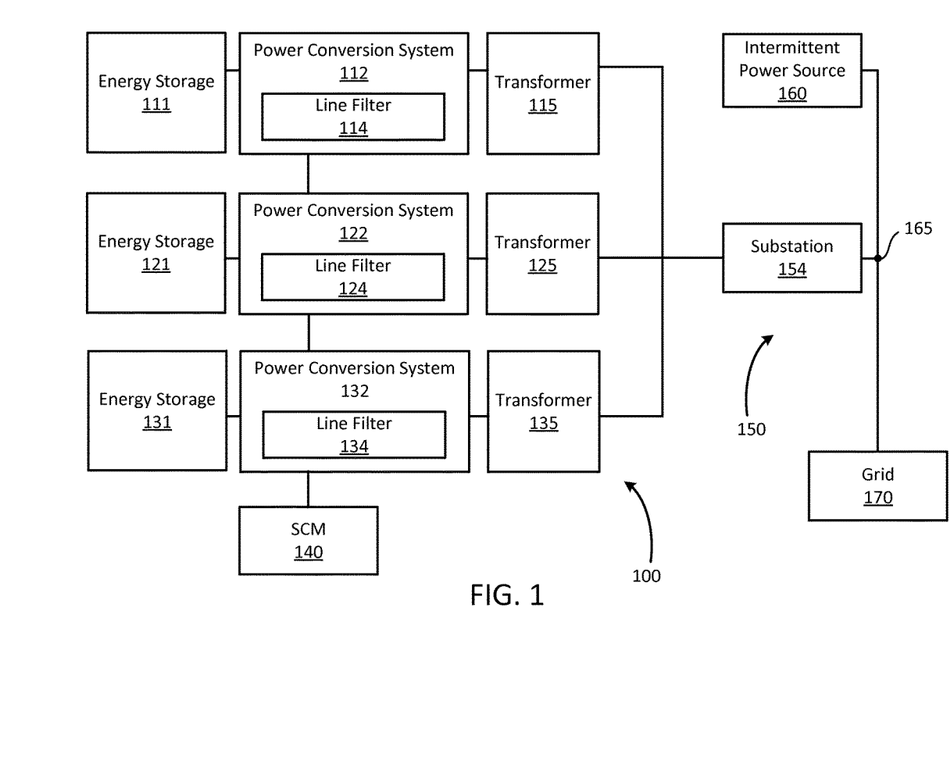
FIG. 1 is a schematic block diagram of a large scale power management system.

FIG. 1 is a schematic block diagram of a large scale power management system (PMS) 100 coupled to a distribution network 150. The power management system includes energy storage arrays 111, 121, and 131. The energy storage arrays are each coupled to a respective power conversion system 112, 122, and 132, and the power conversion systems are each coupled to a respective transformer 115, 125, and 135. The power conversion systems each include a respective line filter 114, 124, and 134. The power conversion systems are described in further detail below with reference to FIG. 2.

The transformers are coupled to a substation 154 that is coupled to a regenerative power source 160 and a grid 170. In operation, the power management system provides one or more support services to intermittent power source 160 and/or one or more ancillary services to grid 170.

The power management system includes a system control module (SCM) 140 operatively linked to each of the inverters through a communication interface. The SCM provides the inverters control signals and/or data via the communication interface, including, for example, target active and reactive power settings, distribution network status information, and activate/standby control commands. Distribution network status information includes, for example, voltage, current, active power, reactive power, and frequency information derived, e.g., from one or more sensors coupled to distribution network 150 (not shown). Based on this information, the SCM can control the operation of each power conversion system so that the power management system appears to the distribution network as a single high capacity system.

SCM 140 issues target active power settings ("P commands") and target reactive power settings ("Q commands") to each of the inverters based on system performance requirements. For example, in a frequency regulation mode, SCM 140 may issue a P command to increase the amount of active power transferred from an energy storage array to distribution network 150 in response to detecting a drop in frequency on the distribution network.

Further, in a voltage regulation mode, SCM 140 may issue a Q command to increase the amount of reactive power transferred between an energy storage array and distribution network 150 in response to detecting a voltage drop. Moreover, in a VAR regulation mode, SCM 150 may issue a Q command to adjust the amount of reactive power transferred between an energy storage array and distribution network 150 in response to an out-of-limit condition.

SCM 140 may also issue P and Q commands as necessary to manage power transferred at a point of interconnection (POI) 165 between an intermittent power source 160 and grid 170. For example, SCM 140 may issue a P command to absorb power generated by intermittent power source 160 to avoid violating a positive ramp-rate limit during a sudden increase in power output by the intermittent power source. Similarly, SCM 140 may issue a P command to provide power to distribution network 150 upon a sudden drop in power output by the intermittent power source to avoid violating a negative ramp-rate limit.

During periods of low volatility, low power production, or reduced response time requirements, SCM 140 may place one or more of the power conversion systems in standby mode by issuing a standby control command to the corresponding power conversion system. In response, control logic for the power conversion system stops gating pulses to a power electronic switching section of the inverter. The control logic for the power conversion system also configures the power conversion system so that the line filter, or a capacitor bank of the line filter, is bypassed, leaving an unfiltered electrical connection between the power electronic switching and the transformer.

Upon encountering a need for increased capacity, SCM 140 issues an activate control command to at least one power conversion system in standby mode. In response to receiving the activate control command, the power conversion system in standby mode exits the standby mode by restarting the gating pulses to the power electronic switching section and bringing the line filter back into the circuit between the power electronic switching section and the transformer. That power conversion system then resumes operation to supply the needed capacity and/or to support the activation of additional systems from standby mode.

When the line filter is brought back into the circuit, it can sink or source reactive power for a period of time from the distribution network and potentially cause disturbances in service or a utility grid violation. To avoid disturbances or a violation, SCM 140 also issues a Q command to one or more of the active power conversion systems. The active systems provide reactive power to compensate for the reactive power that the line filter sinks or sources from the distribution network for the period of time. When the line filter reaches a stable state, SCM 140 issues another Q command to the active power conversion systems to cancel the compensating reactive power.

In some implementations, a single active power conversion system is used to support the activation of multiple systems from standby mode. In cases where reactive power flows resulting from activating multiple systems in parallel exceeds the reactive power capacity of the single system, SCM 140 can reactive the systems in standby in a staggered fashion, e.g, bringing on another system when the line filter of a previously activated system has reached a stable state.

In some implementations, SCM 140 can be implemented as a master controller associated with one of the inverters such that each of the other inverters is operated as a slave component. Further, some implementations provide control redundancy by incorporating a controller in each of the power conversion systems such that any one of the controllers may operate as a master controller. In other implementations, the functionality of SCM 140 is provided by the controllers associated with each of the inverters, for example, using a distributed control topology. In some implementations, SCM 140 includes a limiter to prevent inverters from toggling between active and standby modes too rapidly, e.g., by stopping a toggle if a threshold number of toggles has occurred within a specified time frame.

In some implementations, the energy storage arrays include a plurality of batteries coupled in series, in parallel, or a series-parallel configuration. In other implementations, the energy storage arrays may include, for example, capacitors, flywheels, super-conducting magnetics, or combinations thereof.

In some implementations, the system control module is configured to initiate a deactivation sequence when the average power output drops below a first threshold for a first period of time and the average variance drops below a second threshold for a second period of time. In some examples, the first threshold is set to target a utilization rate of 66% per active inverter. For example, in a power management system including four equally sized power conversion system/energy source pairs, each operating at 49.5% capacity, the system control module may initiate a deactivation sequence for one of the DPRs, thereby increasing the utilization rate of the other three DPRs to 66%. The first period of time, the second period of time, and/or the second threshold may be configured based on historical data, regional forecasts, a maximum ramp rate capacity of the regenerative power resource, or a combination of this and/or other information.

In some implementations, the system control module is configured to compensate for real power flows at the distribution network due to power conversion systems entering or exiting the standby mode. For example, suppose that one of the power conversion systems draws more real power in the standby mode, e.g., to keep one or more batteries at a constant temperature, resulting in a reduction of real power at the distribution grid. The system control module can configure one or more of the other power conversion modules to provide a compensatory real power flow to the grid to compensate for the reduction of real power.

In some implementations, the system control module is configured to compensate for a reactive power flow resulting from causing one or more power conversion systems to enter the standby mode. For example, the system control module can configure one or more other power conversion systems to provide a compensatory reactive power flow at about the same time as configuring the power conversion system to enter the standby mode.

Figure 2:
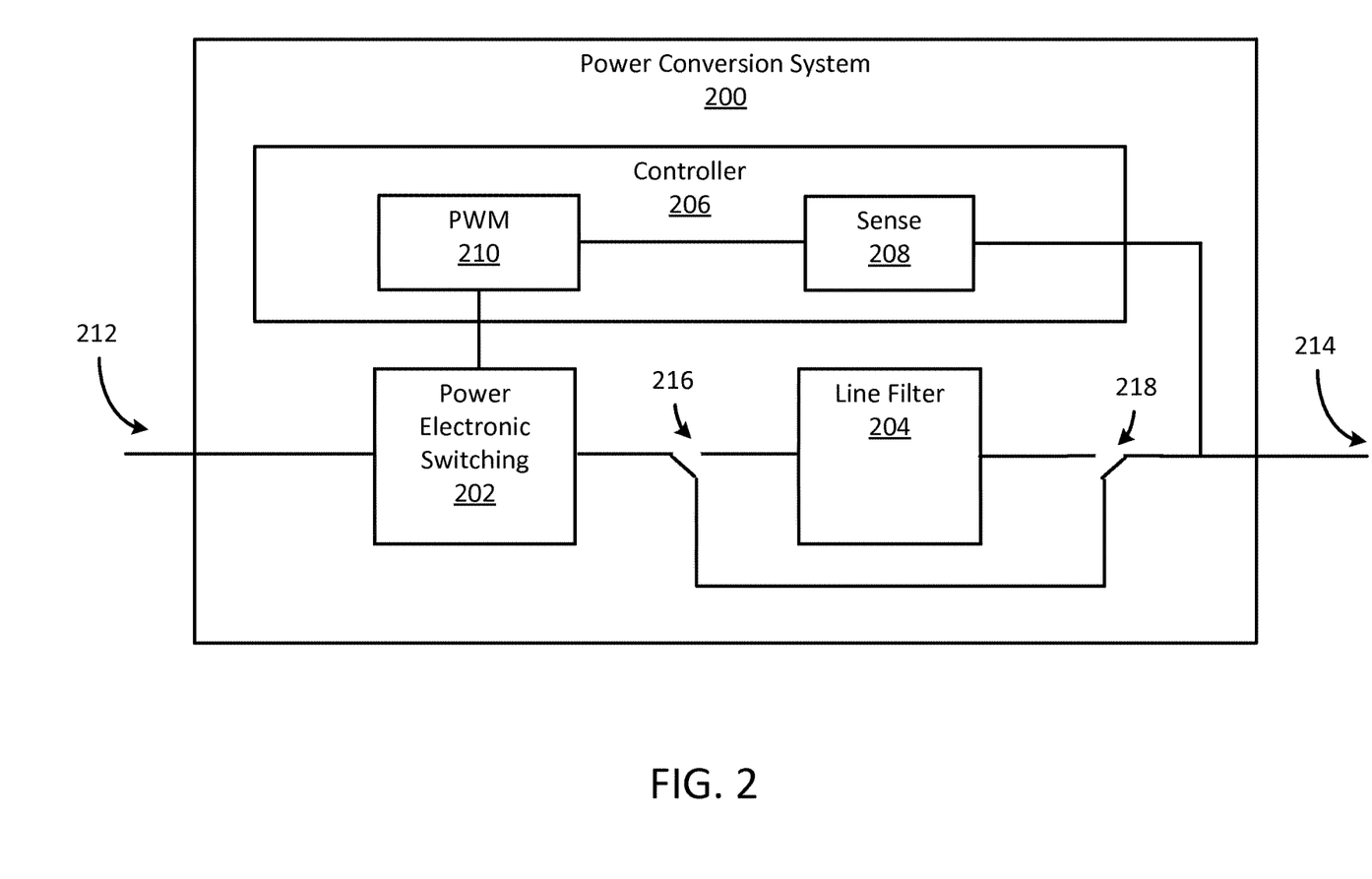
FIG. 2 is a block diagram of an example power conversion system.

FIG. 2 is a block diagram of an example power conversion system 200. The power conversion system can be used, for example, in the power management system 100 of FIG. 1. The power conversion system includes power electronic switching 202 configured to convert DC power at a first terminal 212 to AC power and a line filter 204 configured to filter the AC power and provide the filtered power to a second terminal 214. In some implementations, the power electronic switching is also configured to convert AC power at the second terminal into DC power at the first terminal.

The power conversion system includes a controller 206 that includes a sensing module 208 and a pulse width modulation (PWM) module. The sensing module is configured to sense the output of the line filter, and the PWM module is configured to generate a PWM control signal to the power electronic switching. The controller can include digital logic to implement one or more inverter functions, e.g., receiving P and Q commands and configuring the power electronic switching to implement the commands, and receiving commands to enter and exit a standby mode. The controller can be coupled to a master controller or a network of other invertor controllers.

In some implementations, the power electronic switching is implemented by three-phase sinusoidal pulse-width modulated (PWM) inverters operating in current-controlled mode to generate three-phase sinusoidal output currents. The inverters may include half-bridge or full bridge switching configurations utilizing insulated-gate bipolar transistor (IGBT) modules as switching devices. The line filter is typically an LC circuit. In some implementations, the line filter is implemented by a reactor and capacitor section to filter high frequency harmonics produced by the inverters due to the applied PWM control techniques.

To adjust the amount and frequency of power transferred from the first terminal to the second terminal, the PWM module can send a switching control signal having a specific duty cycle to the power electronic switching. The amount of power transferred through any IGBT switch varies according to the duty cycle of the switching control signal. Also, the frequency of the AC power transferred from the line filter varies according to the duty cycle.

To set the duty cycle so that the frequency and power matches a commanded frequency and power, a sensing module can measure the frequency of a feedback signal from the line filter. The feedback signal can alternatively be captured at the output of a transformer or substation. The controller compares this measured AC frequency from the feedback signal to a reference frequency and then causes the sensor to send an adjustment signal to the PWM in order to adjust the duty cycle of the switching control signal as needed.

The power conversion system can be configured, e.g., by a command from an external controller, to enter a standby mode. In standby mode, the line filter is bypassed, e.g., by a pair of switches 216 and 218, so that the power electronic switching is directly electrically connected to the second terminal. Alternatively, in some implementations, one or more capacitors of the line filter are bypassed. In some implementations, the line filter is not bypassed and one or more other power conversion systems are used to compensate for the reactive power flows of the line filter. In standby mode, the PWM module ceases switching the control signal to the power electronic switching.

Configuring the power conversion system into standby mode can reduce power consumption because the power electronic switching is no longer toggling and the line filter is not discharging power. When the power conversion system exits the standby mode into an active mode, the line filter presents a reactance to the second terminal. If the second terminal is connected to the grid, the line filter can sink or source reactive power from the grid for a period of time after exiting standby mode.

Figure 3:
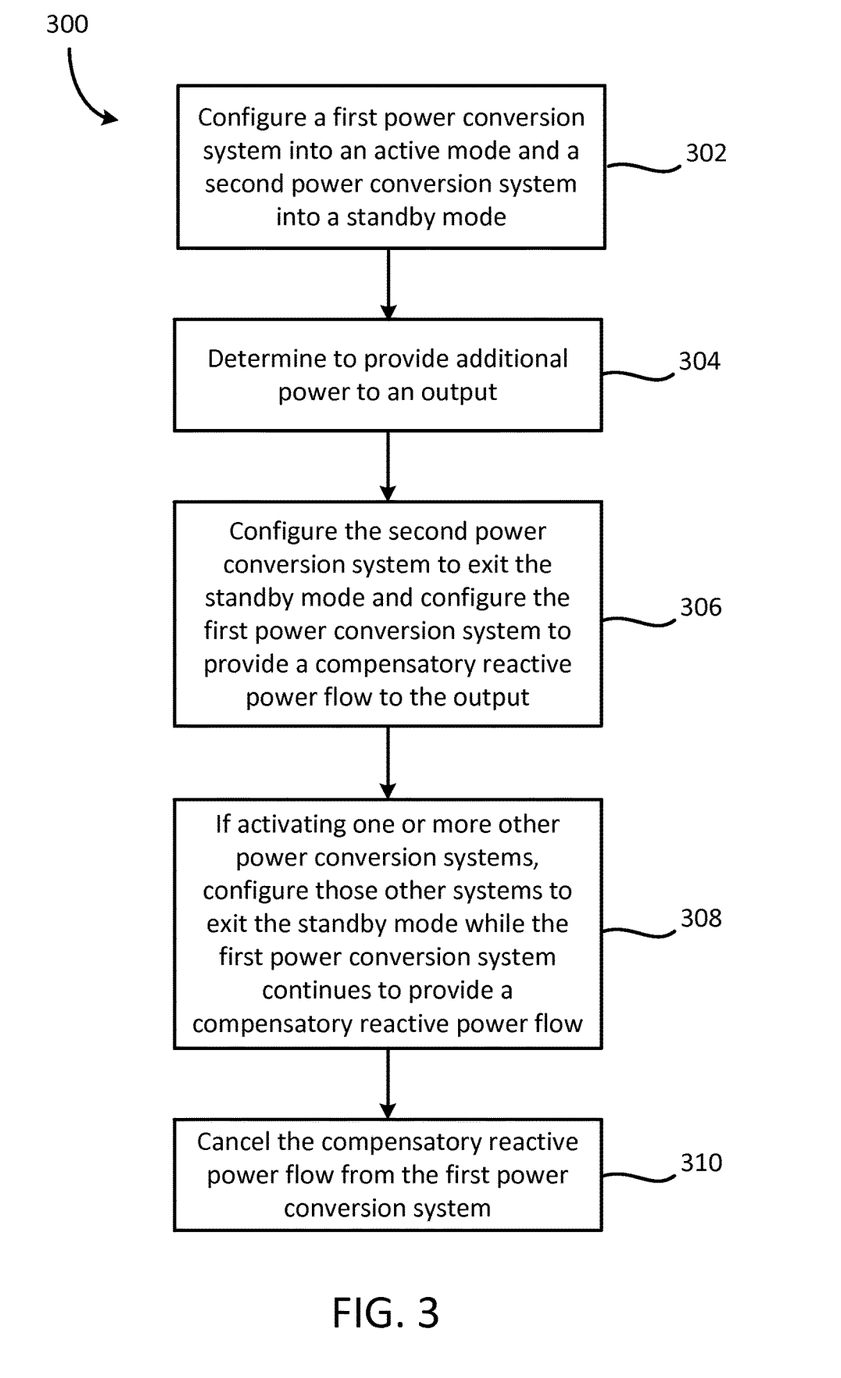
FIG. 3 is a flow diagram of an example process performed by a control system for a power management system.

FIG. 3 is a flow diagram 300 of an example process 300 performed by a control system for a power management system. The control system can be, e.g., the system control module 140 of FIG. 1, and the power management system can be, e.g., the power management system of FIG. 1.

The control system configures a first power conversion system into an active mode and a second power conversion system into a standby mode (302). Each power conversion system is coupled to a respective energy source, and each power conversion system is configured to provide power to a common output. The control system may determine to configure the second power conversion system into a standby mode, for example, because the control system determines that an intermittent power source (e.g., a wind farm) coupled to the common output is providing a steady amount of power.

While the first power conversion system is operating in the active mode and the second power conversion system is operating in the standby mode, the control system determines to provide additional power to the common output (304). For example, the control system may determine to provide additional power because an intermittent power source is providing a decreasing amount of power. If the intermittent power source is a wind farm, the control system may determine that a current wind speed has one or more wind turbines at a point on a power curve where relatively small changes in wind speed result in large changes in power output.

The control system can determine to activate one or more power conversion systems that are in standby mode. For example, if the wind speed decreases sharply, the control system may determine to activate more than one power conversion system for ramp control. For purposes of illustration, suppose that the control system determines to activate at least the second power conversion system.

The control system configures the second power conversion system to exit the standby mode and configures the first power conversion system to provide a compensatory reactive power flow to the output (306). When the second power conversion system exits the standby mode, the second power conversion system provides a reactive power flow to the output, e.g., because a line filter within the second power conversion system is electrically exposed to the output. The first power conversion system provides the compensatory reactive power flow at substantially the same time, thereby mitigating parasitic disturbances at the output from the second inverter transitioning from the standby mode to an active mode.

The control system can be pre-programmed or configured with the amplitude and duration of the compensatory reactive power flow (e.g., 200 kVAR for 30 or 40 ms). Hence, the control system need not measure the actual reactive power flow from the second power conversion system.

If the control system is activating one or more other power conversion systems, the control system can activate those other systems to exit the standby mode while the first power conversion system continues to provide a compensatory reactive power flow (308). For example, the control system can activate the other systems one at a time. If the other systems provide a reactive power flow of about the same duration and amplitude as the reactive power flow from the second power conversion system, the control system does not have to reconfigure the first control system. If the other systems are different, the control system can reconfigured the first control system.

After the second power conversion system and any other power conversion systems have stabilized (e.g., so that a line filter of the second power conversion system is no longer sinking reactive power), the control system cancels the compensatory reactive power flow from the first power conversion system (310).

In some implementations, the control system can activate two or more power conversion systems at substantially the same time. If an active system is capable of supplying a compensatory reactive power flow substantially equal to the reactive power flows of the power conversion systems being activated, then the control system can configure that active system to provide that compensatory reactive power flow.

If two or more active systems are capable of supplying the compensatory reactive power flow, then the control system can configure those active systems to provide the compensatory reactive power flow. In this manner, the control system can activate two or more power conversion systems relatively quickly. Different activation sequences are illustrated in FIGS. 4-6.

Figure 4:
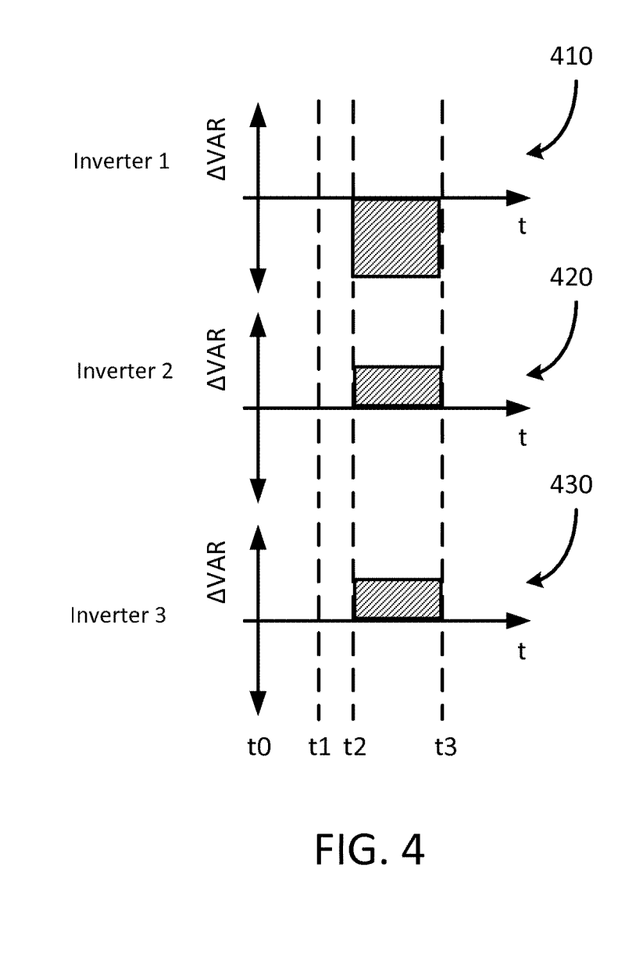
FIG. 4 shows three charts that illustrate an example scenario where two power conversion systems are activated in a parallel activation sequence.

FIG. 4 shows three charts 610, 620, and 630 that illustrate an example scenario where two power conversion systems are activated in a parallel activation sequence. Each chart illustrates a change in reactive power output of a corresponding power conversion system over time.

At time t0, Power conversion system 1 is in an active mode, and Power conversion system 2 and Power conversion system 3 are in a standby mode. At time t1, a control system determines two additional power conversion systems are necessary to satisfy a demand. At time t2, the control system issues a Q command to Power conversion system 1 to provide a compensatory reactive power flow. The control system also issues an activate control command to Power conversion system 2 and Power conversion system 3. The magnitude of the compensatory reactive power flow is substantially equal to the sum of the magnitudes of the reactive power flows from Power conversion systems 2 and 3. At time t3, line filters for Power conversion systems 2 and 3 stabilize and the control system cancels the compensatory reactive power flow from Power conversion system 1.

Figure 5:
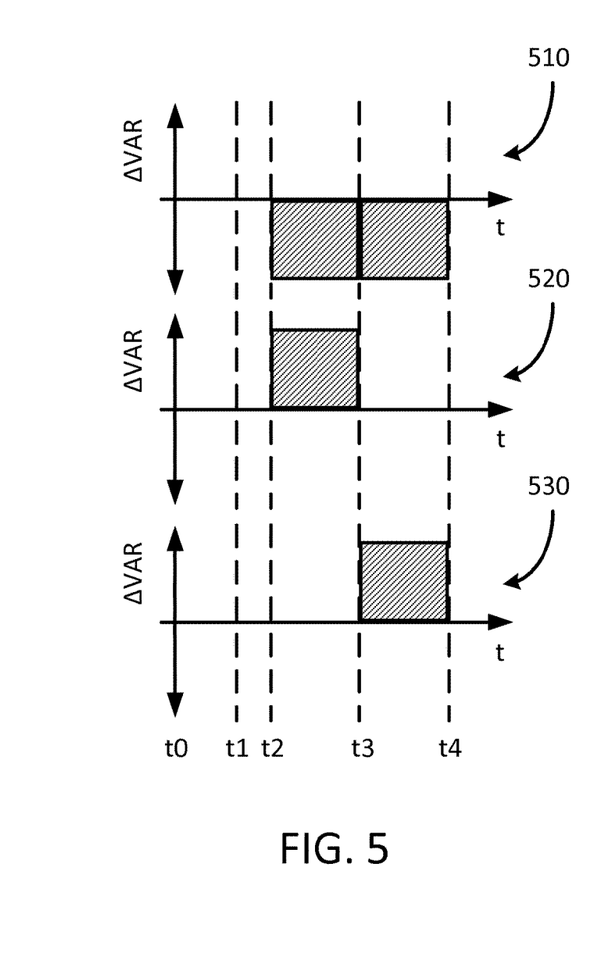
FIG. 5 shows three charts that illustrate an example scenario where two power conversion systems are activated in a series activation sequence.
Figure 6:
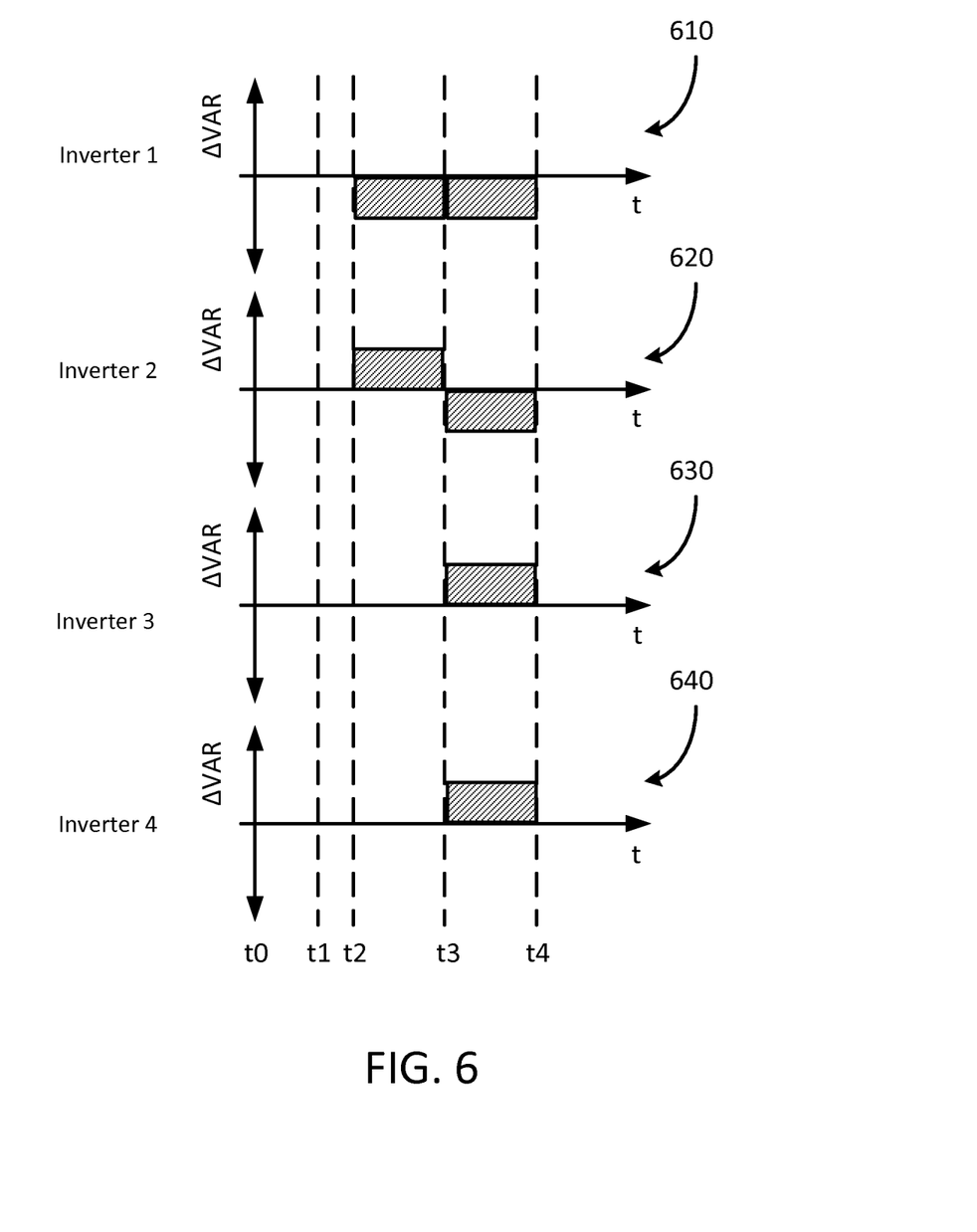
FIG. 6 shows three charts that illustrate an example scenario where two power conversion systems are activated in a combined activation sequence.

FIG. 5 shows three charts 510, 520, and 530 that illustrate an example scenario where two power conversion systems are activated in a series activation sequence. Each chart illustrates a change in reactive power output of a corresponding power conversion system over time.

At time t0, Power conversion system 1 is in an active mode, Power conversion systems 2 and 3 are in a standby mode. At time t1, a control system determines two additional power conversion systems are necessary to satisfy a demand. At time t2, the control system issues a Q command to Power conversion system 1 to provide a compensatory reactive power flow. The control system also issues an activate control command to Power conversion system 2. At time t3, the reactive power draw by Power conversion system 2 ceases and the control system issues an activate command to Power conversion system 3. At time t4, the reactive power draw by Power conversion system 3 ceases and the control system cancels the compensatory reactive power flow from Power conversion system 1.

FIG. 6 shows three charts 610, 620, and 630 that illustrate an example scenario where two power conversion systems are activated in a combined activation sequence. Each chart illustrates a change in reactive power output of a corresponding power conversion system over time.

At time t0, Power conversion system 1 is in an active mode, while the other power conversion systems are in standby. At time t1, a control system determines two additional power conversion systems are necessary to satisfy a demand. At time t2, the control system configures Power conversion system 1 to exit the standby mode and Power conversion system 1 to provide a compensatory reactive power flow. At time t3, a line filter of Power conversion system 2 stabilizes. The control system configures Power conversion systems 3 and 4 to exit the standby mode and configures each of Power conversion systems 1 and 2 to provide a respective compensatory reactive power flow. At time t4, line filters of Power conversion systems 3 and 4 stabilize. The control system cancels the compensatory reactive power flows of Power conversion systems 1 and 2.

Figure 7:
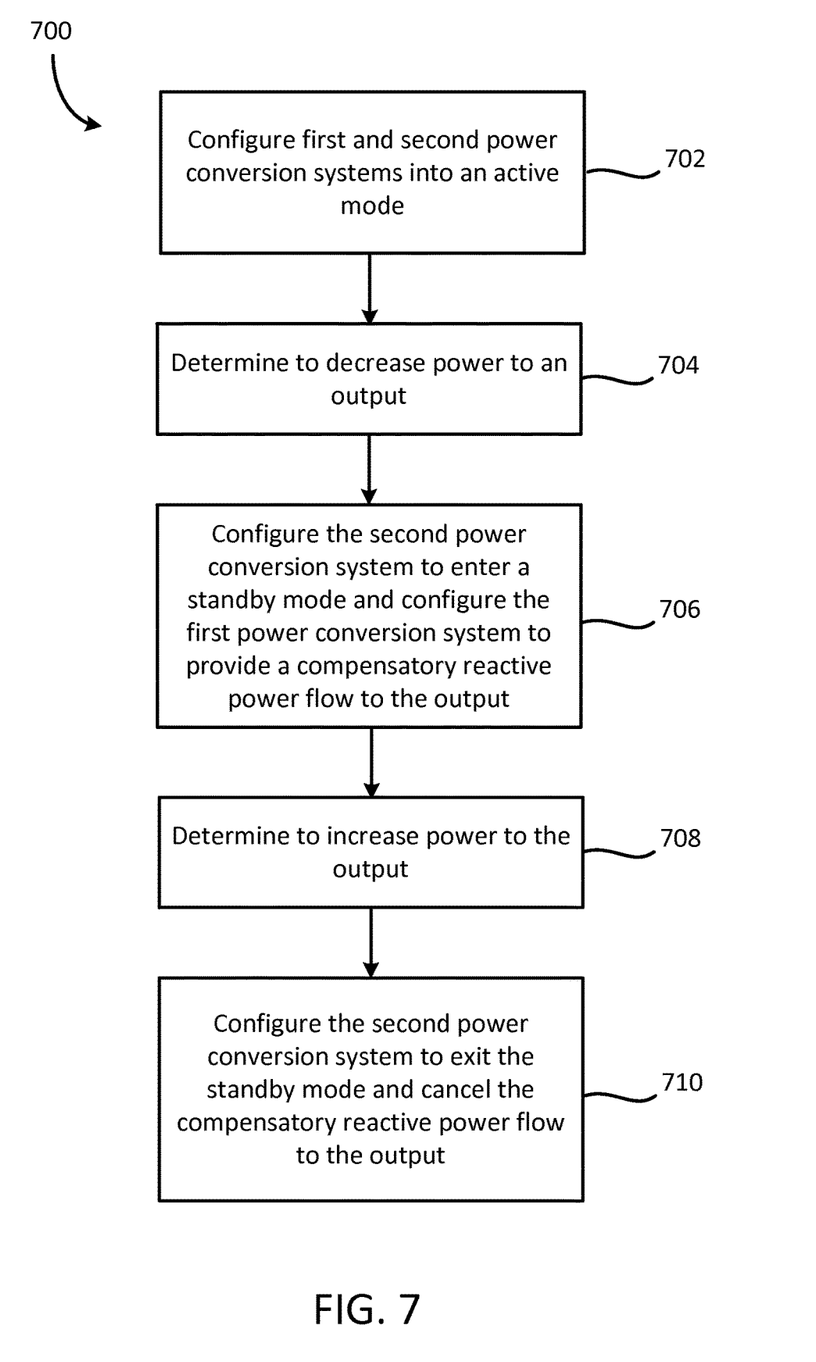
FIG. 7 is a flow diagram of an example process performed by a control system for a power management system.

FIG. 7 is a flow diagram of an example process 700 performed by a control system for a power management system. In this example, the power management system includes two or more power conversion systems that can operate in at least a standby mode and an active mode. In the standby mode, the power conversion system stops gating power electronic circuitry and a line filter, or one or more capacitors of the line filter, is left exposed to an output of the power management system.

The control system configures first and second power conversion systems into the active mode (702). Both systems are providing power to an output. The control system then determines to decrease the total power at the output by causing one of the power conversion systems to enter the standby mode (704). For example, the control system can determine that the wind speed at a wind farm is decreasing.

The control system configures the second power conversion system to enter the standby mode (706). A line filter of the second power conversion system is left exposed to the output, and hence provides a reactive power flow at the output. The control system configures the first power conversion system to provide a compensatory reactive power flow to the output. This prevents a net reactive power flow from being substantially seen at the output due to the second power conversion system entering the standby mode.

The control system then determines to increase power to the output (708). For example, the control system may determine that the wind speed at a wind farm is decreasing. The control system configures the second power conversion system to exit the standby mode and cancels the compensatory reactive power flow from the first control system (710).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, or a combination of one or more of them.

The processes and logic flows described in this specification can be performed by one or more programmable processors executing one or more computer programs (also known as a program, software, software application, script, or code) to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A power management system comprising:
a first inverter coupled to a load;
a second inverter coupled to the load in parallel with the first inverter;
a line filter coupled to the second inverter; and
an inverter control module coupled to the first and second inverters;
wherein when the second inverter is transitioning from a standby mode, in which the second inverter is not providing power to the load, to an active mode, in which the second inverter is providing power to the load, the inverter control module is configured to:

cause the first inverter to compensate for at least a portion of reactive power flows occurring during a period of time in which the second inverter is transitioning from the standby mode to the active mode, and cause the first inverter to stop compensating for the reactive power flows after the period of time passes;

wherein the reactive power flows are sourced to the line filter when the second inverter is transitioning from the standby mode to the active mode.

2. The power management system of claim 1, further comprising a third inverter coupled to the load in parallel with the first and second inverters, wherein at least one of the first inverter and the second inverter is configured to compensate for at least a portion of a change in reactive power flow presented at an output of the third inverter upon the third inverter transitioning from a standby mode to an active mode.

3. The power management system of claim 2, wherein the inverter control module is further coupled to the third inverter, and is further configured to stagger activation of the second and third inverters.

4. The power management system of claim 1, wherein the line filter is an LC filter.

5. The power management system of claim 1, wherein causing the second power conversion system to exit the standby mode comprises configuring a pulse width modulation (PWM) control module to provide a PWM control signal to the power electronic switching.

6. A power management system comprising:
a first power conversion system coupled to a first energy source;
a second power conversion system coupled to a second energy source, wherein the first power conversion system and the second power conversion system are configured to provide power to a common output in an active mode, and the second power conversion system is configured to not provide power from the second energy source to the common output in a standby mode; and
a control system coupled to both the first power conversion system and the second power conversion system and configured to:
cause, while the first power conversion system is operating in an active mode and the second power conversion system is operating in a standby mode, the second power conversion system to exit the standby mode, the second power conversion system providing a reactive power flow to the common output for a period of time upon exiting the standby mode;
cause the first power conversion system to provide a compensatory reactive power flow to the common output to compensate for at least a portion of the reactive power flow from the second power conversion system; and
cause the first power conversion system to stop providing the compensatory reactive power flow to the common output after the period of time passes;
wherein the second power conversion system comprises power electronic switching and a line filter, and wherein causing the second power conversion system to exit the standby mode comprises configuring the second power conversion system to electrically expose the line filter to the common output.

7. The power management system of claim 6, further comprising a third power conversion system coupled to a third energy source and configured to provide power to the common output, wherein the control system is configured to:
determine, while the first power conversion system is operating in the active mode and the second and third power conversion systems are operating in the standby mode, to provide power to the common output from both the second and third energy sources;
cause the second power conversion system to exit the standby mode, the second power conversion system providing a first reactive power flow to the common output for a first period of time upon exiting the standby mode;
cause the first power conversion system to provide a first compensatory reactive power flow to the common output for the first period of time;
cause, after the first period of time, the third power conversion system to exit the standby mode, thereby providing a second reactive power flow to the common output for a second period of time, while the first power conversion system continues to provide the first compensatory reactive power flow to the common output for the second period of time; and
cause, after the second period of time, the first power conversion system to stop providing the first compensatory reactive power flow to the common output.

8. The power management system of claim 6, wherein the control system comprises a system control module, and wherein the first power conversion system includes a first inverter controller and the second power conversion system includes a second inverter controller, and wherein causing the second power conversion system to exit the standby mode comprises sending an activate command to the second inverter controller, and wherein causing the first power conversion system to provide a compensatory reactive power flow comprises sending a reactive power command to the first inverter controller.

9. The power management system of claim 6, wherein the common output and the control system are coupled to an intermittent power source, and wherein the control system is configured to determine to provide additional power to the common output by determining that the intermittent power source is providing a decreasing amount of power.

10. The power management system of claim 9, wherein the intermittent power source comprises one or more wind turbines coupled to a utility grid.

11. The power management system of claim 9, wherein the control system is further configured to:
determine that the intermittent power source is providing an increasing amount of power; and
cause the first power conversion system or the second power conversion system or both to store energy from the intermittent power source in the first and second energy sources.

12. The power management system of claim 10, wherein determining that the intermittent power source is providing a decreasing amount of power comprises determining that the one or more wind turbines are operating at a particular point on a power curve where relatively small changes in wind speed result in large changes in power output.

13. A method performed by a control system of a power management system, the method comprising:
configuring a first power conversion system into an active mode so that the first power conversion system is providing power from a first energy source to a common output;
configuring a second power conversion system into a standby mode so that the second power conversion system is not providing power from a second energy source to the common output;

while the first power conversion system is operating in the active mode and the second power conversion system is operating in a standby mode, determining to provide additional power to the common output;

configuring the second power conversion system to exit the standby mode, thereby providing a reactive power flow to the common output; and configuring the first power conversion system to provide a compensatory reactive power flow to the common output to compensate for at least a portion of the reactive power flow;

wherein the second power conversion system provides the reactive power flow for a period of time upon exiting the standby mode, and wherein configuring the first power conversion system to provide the compensatory reactive power flow comprises, after the period of time passes, configuring the first power conversion system to stop providing the compensatory reactive power flow to the common output.

14. The method of claim 13, further comprising:

while the first power conversion system is operating in the active mode and the second power conversion system and a third power conversion system coupled to a third energy source are operating in the standby mode, determining to provide power to the common output from both the second and third energy sources;

configuring the second power conversion system to exit the standby mode, thereby providing a first reactive power flow to the common output for a first period of time;

configuring the first power conversion system to provide a first compensatory reactive power flow to the common output for the first period of time;

after the first period of time, configuring the third power conversion system to exit the standby mode, thereby providing a second reactive power flow to the common output for a second period of time, while the first power conversion system continues to provide the first compensatory reactive power flow to the common output for the second period of time; and after the second period of time, configuring the first power conversion system to stop providing the first compensatory reactive power flow to the common output.

15. The method of claim 13, wherein configuring the second power conversion system to exit the standby mode comprises sending an activate command to the a second inverter controller of the second power conversion system, and wherein configuring the first power conversion system to provide a compensatory reactive power flow comprises sending a reactive power command to a first inverter controller of the first power conversion system.

16. The method of claim 13, wherein the second power conversion system comprises power electronic switching and a line filter, and wherein configuring the second power conversion system to exit the standby mode comprises configuring the second power conversion system to electrically expose the line filter to the common output.

17. The method of claim 16, wherein the line filter is an LC filter.

18. The method of claim 16, wherein configuring the second power conversion system to exit the standby mode comprises configuring a pulse width modulation (PWM) control module to provide a PWM control signal to the power electronic switching.

19. The method of claim 13, wherein the common output and the control system are coupled to an intermittent power source, and wherein determining to provide additional power to the common output comprises determining that the intermittent power source is providing a decreasing amount of power.

20. The method of claim 19, wherein the intermittent power source comprises one or more wind turbines coupled to a utility grid.

21. The method of claim 19, further comprising:

determining that the intermittent power source is providing an increasing amount of power; and configuring the first power conversion system or the second power conversion system or both to store energy from the intermittent power source in the first and second energy sources.

22. The method of claim 20, wherein determining that the intermittent power source is providing a decreasing amount of power comprises determining that the one or more wind turbines are operating at a particular point on a power curve where relatively small changes in wind speed result in large changes in power output.

23. The method of claim 13, further comprising:

configuring the first power conversion system to provide a compensatory real power flow to the common output to compensate for a real power flow resulting from the second power conversion system exiting the standby mode.

24. A method performed by a control system of a power management system, the method comprising:

configuring first and second power conversion systems into an active mode so that the first and second power conversion systems are providing power from respective first and second energy sources to a common output;

determining to decrease a total amount of power at the common output;

configuring the second power conversion system to enter a standby mode in which the second power conversion system no longer provides power from the second energy source to the common output, thereby providing a reactive power flow to the common output; and configuring the first power conversion system to provide a compensatory reactive power flow to the common output to compensate for at least a portion of the reactive power flow resulting from the second power conversion system transitioning from the active mode to the standby mode;

wherein the second power conversion system comprises power electronic switching and a line filter, and wherein causing the second power conversion system to enter the standby mode comprises configuring the second power conversion system to electrically expose the line filter to the common output; and wherein the second power conversion system provides the reactive power flow for a period of time upon entering the standby mode, and wherein configuring the first power conversion system to provide the compensatory reactive power flow comprises, after the period of time passes, configuring the first power conversion system to stop providing the compensatory reactive power flow to the common output.

25. The method of claim 24, further comprising:

determining to increase the total amount of power at the common output;

configuring the second power conversion system to exit the standby mode; and cancelling the compensatory reactive power flow from the second power conversion system.

* * * * *